US012739034B2

(12) United States Patent
Sanjuan Flores et al.

(10) Patent No.: US 12,739,034 B2
(45) Date of Patent: Sep. 15, 2026

(54) METHOD AND APPARATUS TO INCREASE OPTIC LINE CAPACITY

(71) Applicant: Nokia Solutions and Networks Oy, Espoo (FI)

(72) Inventors: Tomas Sanjuan Flores, Madrid (ES); Alfonso Fernandez Duran, Madrid (ES)

(73) Assignee: Nokia Solutions and Networks Oy, Espoo (FI)

(*) Notice: Subject to any disclaimer, the term of this patent is extended or adjusted under 35 U.S.C. 154(b) by 241 days.

(21) Appl. No.: 18/422,578

(22) Filed: Jan. 25, 2024

(65) Prior Publication Data

US 2024/0259105 A1 Aug. 1, 2024

(30) Foreign Application Priority Data

Jan. 31, 2023 (EP) .................................... 23382080

(51) Int. Cl.
*H04B 10/54* (2013.01)
*H04B 10/40* (2013.01)
*H04B 10/524* (2013.01)

(52) U.S. Cl.
CPC ........... *H04B 10/541* (2013.01); *H04B 10/40* (2013.01); *H04B 10/524* (2013.01)

(58) Field of Classification Search
CPC ..... H04B 10/541; H04B 10/40; H04B 10/524
USPC .......................................................... 398/208
See application file for complete search history.

(56) References Cited

U.S. PATENT DOCUMENTS 4,617,553 A * 10/1986 Webster .................. H03M 5/14 341/72
10,491,238 B2 * 11/2019 Sudhakaran .......... H03M 5/145
10,511,463 B2 * 12/2019 Takahashi ............. H04L 25/493
2023/0283377 A1 * 9/2023 Van Veen ............. H04B 10/272 398/58
2024/0305917 A1 * 9/2024 Lefevre .............. H04Q 11/0067
2024/0322913 A1 * 9/2024 Lefevre .............. H04B 10/0795

FOREIGN PATENT DOCUMENTS

WO WO-2016194091 A1 * 12/2016 ........... H01S 5/0683

OTHER PUBLICATIONS

Vincent et al; A Real-Time 25/50/100G Flex-Rate PON Implementation, 2022, European Conference on Optical communication; Optical publishing group, pp. 1-4. (Year: 2022).*

(Continued)

*Primary Examiner* — Amritbir K Sandhu
(74) *Attorney, Agent, or Firm* — Harness, Dickey & Pierce, P.L.C.

(57) ABSTRACT

The method may include receiving coded data symbols based on data bits of an input binary data stream. For example, each of the coded data symbols may have a symbol duration of a type in relation to a bit duration of the input binary data stream. Moreover, the method may include comparing the symbol duration of the coded data symbols. The method may also include converting said coded data symbols into a transformed symbol sequence. Additionally, the method may further include generating an output signal based on the transformed symbol sequence for transmission in the communication system.

15 Claims, 14 Drawing Sheets

(56) References Cited

OTHER PUBLICATIONS

Alin-Mihai et al; Miller Code Usage in Visible Light Communications under the PHY I Layer of the IEEE 802.15.7 Standard, Jul. 2014, IEEE, pp. 1-4. (Year: 2014).*

Office Communication for European Application No. 23 382 080.2 dated Apr. 24, 2026.

* cited by examiner 100
101
NRZ
102
Miller
103
cMiller
104
mPAM4

105
106
107
108
Miller
cMiller
Bit interval
Distance violation
Bit interval
Distance violation
Eliminated short transitions NRZ spectrum
PSD
Power Spectrum (dB)
Frequency [GHz]

Miller spectrum
PSD
Power Spectrum (dB)
Frequency [GHz]

cMiller spectrum
PSD
Power Spectrum (dB)
Frequency [GHz]

mPAM4 spectrum
PSD
Power Spectrum (dB)
Frequency [GHz]

METHOD AND APPARATUS TO INCREASE OPTIC LINE CAPACITY

CROSS-REFERENCE TO RELATED APPLICATIONS

This application claims priority under 35 U.S.C. § 120 to European Application No. 23382080.2, filed Jan. 31, 2023, the entire contents of each of which are hereby incorporated by reference.

TECHNICAL FIELD

This application relates to optical data communication and network systems, and more particularly, to methods and apparatuses for communicating data with increased optic line capacity.

BACKGROUND

The continuous increase of data consumption by end users leads to a continuous shortage of bandwidth in the networks that provide access to the data. The larger the bandwidth is supported for the communication the higher the cost will be required for components on the end-to-end chain. Such higher cost will lead to lower affordability and thus fewer connected users.

Increase of data rate in a communication system, e.g., especially for optical communications, eventually requires the use of transmitter and receiver devices of wider bandwidth which therefore increases the deployment cost. The cost of transmitter and receiver devices (e.g., lasers and photodiodes) tends to grow exponentially with the bandwidth. Thus, a corresponding solution is urgently required to enable transmission of significant higher throughput using cheaper optic devices, e.g., devices only supporting lower bandwidth.

For optical access communications, Passive Optical Network (PON) is the most widely-used technology for delivering fixed broad-band connectivity. Optical technologies in the access domain have been steadily evolving data rates (bitrates) from 2.5 Gbps to 10 Gbps, and data rates for the next generation being standardized are 25 Gbps and 50 Gbps. Going beyond these rates would require changing the current simple PON techniques for transmission and reception (e.g., using NRZ modulation of a laser together with a photodetector to implement Intensity Modulation and Direct detection, IM/DD) to coherent systems that are more performant but also much more costly.

To overcome the general challenge of high bandwidth requirements, a bandwidth compression should be used. Bandwidth compression allows for reusing lower cost devices for increased capacity. A traditional way of compressing bandwidth required for transmission is to use multilevel modulation (e.g., Pulse-Amplitude-Modulation 4 (PAM4) that uses four levels instead of two levels for coding the data symbols). In optical communications, PAM4 reduces the required bandwidth by a factor of two (which means to double the bitrate). Hence, defining the current PON baseline rate as 25 Gbps, PAM4 allows to achieve 50 Gbps using most of the devices in the 25 Gbps optical chain, thus containing the cost of doubling the speed.

Accordingly, the present disclosure addresses the challenge of reaching a level of bitrate demands compatible with the characteristics of future communication systems, for example, for future optical networks, e.g., PON solutions based on 25 Gbps. In particular, it is desirable to provide a solution to achieve lossless bandwidth compression without compromise of the data bit streams transmitted.

SUMMARY

In view of the needs as indicated above, the present disclosure proposes methods and apparatuses for communicating data able to increase transmission/channel capacity, e.g., optic line capacity in optical communications. The solution proposed in the present disclosure can, for example, achieve reduction of required bandwidth by beyond a factor of two and allows for a factor of at least six in bandwidth compression to enable transmission at a higher speed (data rate) for a corresponding factor of six compared to the traditional use of PAM4, while still reusing the conventional devices of much lower cost in a baseline optical chain. For example, for a baseline of 25 Gbps, the solution proposed in the present disclosure allows for speeds of at least 150 Gbps using 25 Gbps optical devices.

An aspect of the disclosure relates to a method for transmitting data in a communication system. The communication system may include, among others, an optical communication system. The method may comprise receiving coded data symbols based on data bits of an input binary data stream. Specifically, each of the coded data symbols may have a symbol duration of a predetermined type in relation to a bit duration of the input binary data stream. The method may comprise comparing the symbol duration of the coded data symbols. The method may also comprise converting said coded data symbols into a transformed symbol sequence. Additionally, the method may further comprise generating an output signal based on the transformed symbol sequence for transmission in the communication system.

In particular, for converting said coded data symbols into a transformed symbol sequence, the method may further comprise eliminating one or more of the coded data symbols, if a corresponding symbol duration is shorter than or equal to a predefined bit duration. In addition, the method may also comprise maintaining one or more of the coded data symbols, if a corresponding symbol duration is longer than the predefined bit duration.

Configured as above, the proposed method provides an effective coding mechanism for manipulating symbol waveforms, which significantly reduces the number of symbol transitions, thereby allowing for efficient spectrum/bandwidth compression of the transmitted signals. In this way, channel capacity of a communication system can be increased more easily without requiring expensive devices which support large bandwidth. In particular, for implementation in an optical communication system, since the bandwidth compression is achieved by merely reducing the number of symbol transitions, it may be sufficient to employ merely intensity detection for demodulation and decoding processes at a receiving side, which advantageously saves the cost for deploying coherent systems which would otherwise be required for additional signal phase detection in the case of coding data in additional phase dimension to increase transmission capacity.

In an embodiment, each coded data symbol may be associated with one of a first signal level and a second signal level. Thus, the method may further comprise determining the symbol duration of the coded data symbols based on a time separation (e.g., a (measured) time interval) between transitions from the first signal level to the second signal level, or vice versa. According to some embodiments, each data bit may occupy one bit duration corresponding to two half-bit durations. The method may also comprise converting said data bits into the coded data symbols. More specifically, the symbol duration of the predetermined type for each coded data symbol may correspond to one of: two half-bit durations, tree half-bit durations, and four half-bit durations. Alternatively or in addition, the predefined bit duration may include the two half-bit durations.

In some embodiments, the method may further comprise identifying a beginning of an elimination duration, if a corresponding symbol duration of an associated coded data symbol is shorter than or equal to the predefined bit duration. Besides, the method may also comprise identifying an ending of the elimination duration if a following symbol duration corresponding to a subsequent coded data symbol is longer than the predefined bit duration. The method may further comprise maintaining a current signal level of the associated coded data symbol during said elimination duration.

In some embodiments, the method may further comprise determining whether the ending of the elimination duration is located at the beginning of a half-bit duration or at the middle of a half-bit duration. The method may then also comprise, based on the determination, maintaining or inverting a current signal level of the associated coded data symbol for a further subsequent coded data symbol. Specifically, identifying the beginning of the elimination duration may comprise setting a flag indicator if a corresponding symbol duration of an associated coded data symbol is shorter than or equal to the predefined bit duration. More specifically, identifying the ending of the elimination duration may comprise removing said flag indicator if a following symbol duration corresponding to a subsequent coded data symbol is longer than the predefined bit duration.

Configured as above, the proposed coding scheme according to the present disclosure provides a drastic reduction of the required bandwidth. In other words, the proposed mechanism enables a lossless compression of the information to be sent across a transport channel, thereby allowing for a significant increase of transmission speed while still being able to use lower-bandwidth and cheaper, devices for the communication system.

In some embodiments, the method may further comprise converting said transformed symbol sequence into a multilevel signal for the output signal according to a state machine. In particular, the state machine may comprise a plurality of symbol states of a first type and a second type distinct from the first type. Specifically, each symbol state may have an associated signal level and one or more transitions to other symbol states of the state machine. In particular, the one or more transitions may be defined based on a symbol duration of an input symbol of said transformed symbol sequence.

In addition, according to some embodiments, transitions from the symbol states of the first type may not necessarily lead to a signal level transition for the output signal, while transitions from the symbol states of the second type may lead to a signal level transition for the output signal. In particular, a next state of a symbol state of the first type may comprise a symbol state of the second type. In some embodiments, each symbol of said transformed symbol sequence may be associated with one of a first signal level and a second signal level. The method may therefore comprise determining symbol durations of said transformed symbol sequence based on a time separation (e.g., a (measured) time interval) to a previous transition from the first signal level to the second signal level, or vice versa, said symbol durations of said transformed symbol sequence being longer than the predefined bit duration. Specifically, said symbol durations of said transformed symbol sequence may comprise at least one of the following: the tree half-bit durations or the four half-bit durations.

Configured as above, by means of the symbol conversion into multilevel signals based on the proposed state machine having two layers (i.e., the state machine comprising a plurality of symbol states of a first type and a second type distinct from the first type, for example, the inner states and the outer states as shown in FIG. 3(*a*) below, respectively), the method according to the present disclosure further reduces the number of symbol transitions to provide more efficient spectrum/bandwidth compression of the transmitted signals. Compared with the traditional PAM modulation which enables doubling the transmission speed, the proposed method allows for a factor of at least 6 in bandwidth compression. That is, for a baseline of 25 Gbps in an optical transport system as an example, the proposed method allows for transmission speed of at least 150 Gbps while using 25 Gbps optical devices.

Besides, the communication system may comprise an optical communication system in a passive optical network (PON) (i.e., a PON system). Such a PON may comprise a point-to-multipoint set-up whereby unpowered fiber optic splitters may be used to provide a single optical fiber to serve multiple end-points. Such a PON may further comprise an optical line terminal (OLT) which serves as the service provider endpoint, and a number of optical network terminals (ONTs) near end users. Accordingly, the proposed transmitting method may be executed by an optical transmitter of a PON system.

The proposed coding mechanism therefore leverages the effectiveness of amplitude and time durations for compressing the signal energy in a part of the spectrum smaller than typical NRZ used in PON systems (as shown in FIG. 10 below) and expands the channel capacity beyond what the conventional systems can achieve by properly optimizing the signal waveform as indicated above.

Another aspect of the disclosure relates to a method for receiving information data in a communication system. The communication system may be, for example, an optical communication system. In particular, the data may be carried by a multilevel signal. The method may comprise receiving and sampling the multilevel signal. The method may further comprise translating an amplitude of said multilevel signal into a level index based on level threshold crossing detection. Also, the method may further comprise generating a first multilevel symbol sequence by eliminating a signal level transition within a predetermined duration. The method may also comprise generating a second multilevel symbol sequence by eliminating one or more symbols from said first multilevel symbol sequence if a corresponding symbol duration of said one or more symbols is shorter than a predefined threshold duration. Besides, the method may comprise applying multilevel decoding to said second multilevel symbol sequence for obtaining the information data.

Similar to the transmitting method as indicated above, the proposed receiving method allows for data reception with a significant improvement in spectral performance, compared with communication systems using conventional coding techniques (e.g., Miller coding/delay modulation, PAM coding, etc.). In this way, the receiver can, for example when being implemented in an optical communication system, stay with direct intensity detection for reconstructing information data at high bit rates, without switching to costly coherent systems.

In some embodiments, each bit of the data may occupy one bit duration corresponding to two half-bit durations. In particular, the multilevel signal may be sampled at a rate twice a bit rate of the data corresponding to the half-bit durations. According to some embodiments, the predetermined duration may comprise the half-bit durations. In an embodiment, if a group of an even number of consecutive level transitions take place at time intervals corresponding to the half-bit durations, the method may further comprise, for elimination of a signal level transition within said predetermined duration, setting a symbol level index for outputting to the first multilevel symbol sequence based on one or more of preceding and following level indexes of said group.

Alternatively, the method may further comprise, for elimination of a signal level transition within said predetermined duration, if a group of an odd number of three or more consecutive level transitions take place at time intervals corresponding to the half-bit durations, setting a symbol level index for transition in the middle of said group to the nearest level index from one or more of preceding and following level indexes of said group and setting remaining symbol level indexes for outputting to the first multilevel symbol sequence based on the one or more of preceding and following level indexes of said group.

In some embodiments, the predefined threshold duration may comprise four or five half-bit durations. In some embodiments, if a group of consecutive amplitude indexes in the generated first multilevel symbol sequence forms the one or more symbols corresponding to a symbol duration shorter than the predefined threshold duration, the method may further comprise, for elimination of the one or more symbols from said first multilevel symbol sequence, setting one or more symbol level indexes for outputting to the second multilevel symbol sequence. The one or more symbol level indexes may be set based on at least one of the following: the nearest time or level index from one or more of preceding and following level indexes of said group.

Configured as above, the proposed decoding mechanism filters out/eliminates undesired transitions in the detection of the multilevel signal, which ensures an improved decoding performance to reduce the error rate in the transmission.

In some embodiments, for the multilevel decoding, the method may further comprise translating the generated second multilevel symbol sequence into an output data symbol sequence having two signal levels according to a state machine. Specifically, the state machine may comprise a plurality of symbol states of a first type and a second type distinct from the first type. In particular, each symbol state may have an associated signal level and one or more transitions to other symbol states of the state machine. More specifically, the one or more transitions may be defined based on a symbol duration of an input symbol. In addition, transitions from the symbol states of the first type may not necessarily lead to a signal level transition, while transitions from the symbol states of the second type may lead to a signal level transition. According to an embodiment, a next state of a symbol state of the first type may comprise a symbol state of the second type.

In some embodiments, the method may further comprise regenerating a new symbol level transition for a state transition of the state machine associated with a symbol duration corresponding to three or four consecutive half-bit durations. In some embodiments, the multilevel signal may include combinations of amplitudes and delays in amplitude transitions. Furthermore, the multilevel decoding may generate an output bi-level symbol sequence. In particular, the method may further comprise identifying one or more missing transitions in the output bi-level symbol sequence to reconstruct bits of the information data. More specifically, the one or more missing transitions in the output bi-level symbol sequence may be identified based on a flag indicator indicative of a beginning of an elimination duration where a data symbol associated with the one or more missing transitions and having a symbol duration shorter than or equal to a predefined bit duration is eliminated. Similar to the method for transmitting as indicated above, the communication system may comprise a passive optical network (PON) system. Accordingly, the proposed receiving method may be executed by an optical receiver of a PON system.

Configured as above, by employing a two-layer state machine similar to the one for the above indicated transmitting method (i.e., the state machine comprising a plurality of symbol states of a first type and a second type distinct from the first type), the receiving method according to the present disclosure also supports for further reduction in the number of symbol transitions to allow for more efficient spectrum/bandwidth compression of the transmitted signals. It is further appreciated that the proposed decoding scheme based on symbol transition can also provide more tolerance in the error detection.

A further aspect of the disclosure relates to an apparatus for transmitting data in a communication system (e.g., an optical communication system). The apparatus may comprise means for receiving coded data symbols based on data bits of an input binary data stream. Specifically, each of the coded data symbols may have a symbol duration of a predetermined type in relation to a bit duration of the input binary data stream. The apparatus may also comprise means for comparing the symbol duration of the coded data symbols. The apparatus may further comprise means for converting said coded data symbols into a transformed symbol sequence. In particular, said coded data symbols may be converted into the transformed symbol sequence by eliminating one or more of the coded data symbols if a corresponding symbol duration is shorter than or equal to a predefined bit duration. In addition, said coded data symbols may be converted into the transformed symbol sequence by maintaining one or more of the coded data symbols if a corresponding symbol duration is longer than the predefined bit duration. Moreover, the apparatus may further comprise means for generating an output signal based on the transformed symbol sequence for transmission in the communication system.

In one or more embodiments, the proposed transmitting apparatus may comprise means or perform functions similar to the above indicated method for transmitting data in a communication system. It may also provide similar advantages as the above indicated transmitting method.

Another further aspect of the disclosure relates to an apparatus for receiving information data in a communication system (e.g., an optical communication system). In particular, the data may be carried by a multilevel signal. The apparatus may comprise means for receiving and sampling the multilevel signal. The apparatus may also comprise means for translating an amplitude of said multilevel signal into a level index based on level threshold crossing detection. In addition, the apparatus may comprise means for generating a first multilevel symbol sequence by eliminating a signal level transition within a predetermined duration. Also, the apparatus may comprise means for generating a second multilevel symbol sequence by eliminating one or more symbols from said first multilevel symbol sequence if a corresponding symbol duration of said one or more symbols is shorter than a predefined threshold duration.

Besides, the apparatus may further comprise means for applying multilevel decoding to said second multilevel symbol sequence for obtaining the information data.

In one or more embodiments, the proposed apparatus may comprise means or perform functions similar to the above indicated method for receiving information data in a communication system. It may also provide similar advantages as the above indicated receiving method.

Configured as above, the present disclosure provides an effective way of manipulating signal waveforms resulting in a much more efficient spectral behavior. In particular, the proposed methods and apparatuses bring the signal spectrum closer to the low-band region, and therefore cheaper devices of narrow bandwidth, such as optical devices or other means of transport, e.g., microwave Tx, can be used for the same data rates. Thus, for a given transport system, the proposed solution in the present disclosure allows for packing more data within the existing transport capacity. For example, both source and destination end (e.g., e/gNodeB and EPC) equipped with devices according to the proposed solution may allow for more easily deploying a next-generation communication system in an economic way.

Similar to the proposed methods above, the transmitting apparatus and the receiving apparatus as proposed in the present disclosure may be implemented in a PON system, e.g., may be comprised in anyone of an optical line terminal (OLT) and an optical network terminal (ONT) within a PON.

Implementations of the disclosed apparatus (e.g. the means for performing the above indicated steps/functions) may include using, but not limited to, one or more processor, one or more application specific integrated circuit (ASIC) and/or one or more field programmable gate array (FPGA). Implementations of the apparatus may also include using other conventional and/or customized hardware such as software programmable processors.

It will be appreciated that method steps and device features may be interchanged in many ways. In particular, the details of the disclosed devices can be implemented as a method, as the skilled person will appreciate.

BRIEF DESCRIPTION OF THE FIGURES

Embodiments of the disclosure are explained below in an exemplary manner with reference to the accompanying drawings, wherein FIG. 1(*a*) schematically illustrates an exemplary block diagram for a transmitting apparatus according to embodiments of the disclosure;

FIG. 2(*b*) illustrates a histogram chart showing the distribution of symbol durations for the Miller sequence and for the proposed c-Miller sequence according to embodiments of the disclosure;

FIG. 3(*b*) shows an exemplary lookup table for symbol conversion according to embodiments of the disclosure;

DETAILED DESCRIPTION

The present disclosure provides a lossless compression mechanism for information data to be sent across a transport channel. It leverages the effectiveness of amplitude and time durations for compressing the signal energy in a part of the spectrum smaller than the typical Non-Return-to-Zero (NRZ) modulation used in passive optical network (PON) systems and expands the channel capacity beyond what the conventional systems can achieve by optimizing the waveform generated to create a new, much more compact waveform than the one generated with a typical amplitude and time duration using the conventional (original) Miller code (also known as "delay modulation").

In particular, the present disclosure proposes to modify the waveform of data symbols to be transmitted by means of, for example, a compressed Miller coding, which allows to achieve a significant improvement in spectral performance compared to the original Miller coding when applied to transmission systems. The present disclosure provides an improved mechanism of manipulating symbol waveform that results in a much more efficient spectral behavior.

Thus, among others, it is an object of embodiments of the present disclosure to provide a solution that increases bandwidth efficiency for high-capacity data communication systems (e.g., optical communication systems capable of transmitting high-rate data). More specifically, the proposed solution brings the signal spectrum closer to the low-band region, so cheaper devices (e.g., optical devices or other means of transport—e.g., microwave transmitter) of narrow bandwidth can be used for the same data rates. Alternatively, for a given transport system, the proposed solution allows to pack (i.e., transmit/receive) more data within the existing transport capacity. Thereby, less leased or installed capacity would be required if both source and destination end (e.g., e/gNodeB and EPC) are equipped with devices implementing the solution as proposed in the present disclosure. Such devices may be described in further detail in the embodiments below of FIG. 1 and FIG. 7, for both transmitting and receiving side, respectively.

The proposed solution may be implemented in devices within a communication system and/or in a communication network for accessing information data, for example, in an optical communication system for an optical network such as PON system. For example, the proposed methods and apparatuses may be implemented as a coder and a decoder that operates in both ends of the transmission flow.

Figures 1A, 1B:
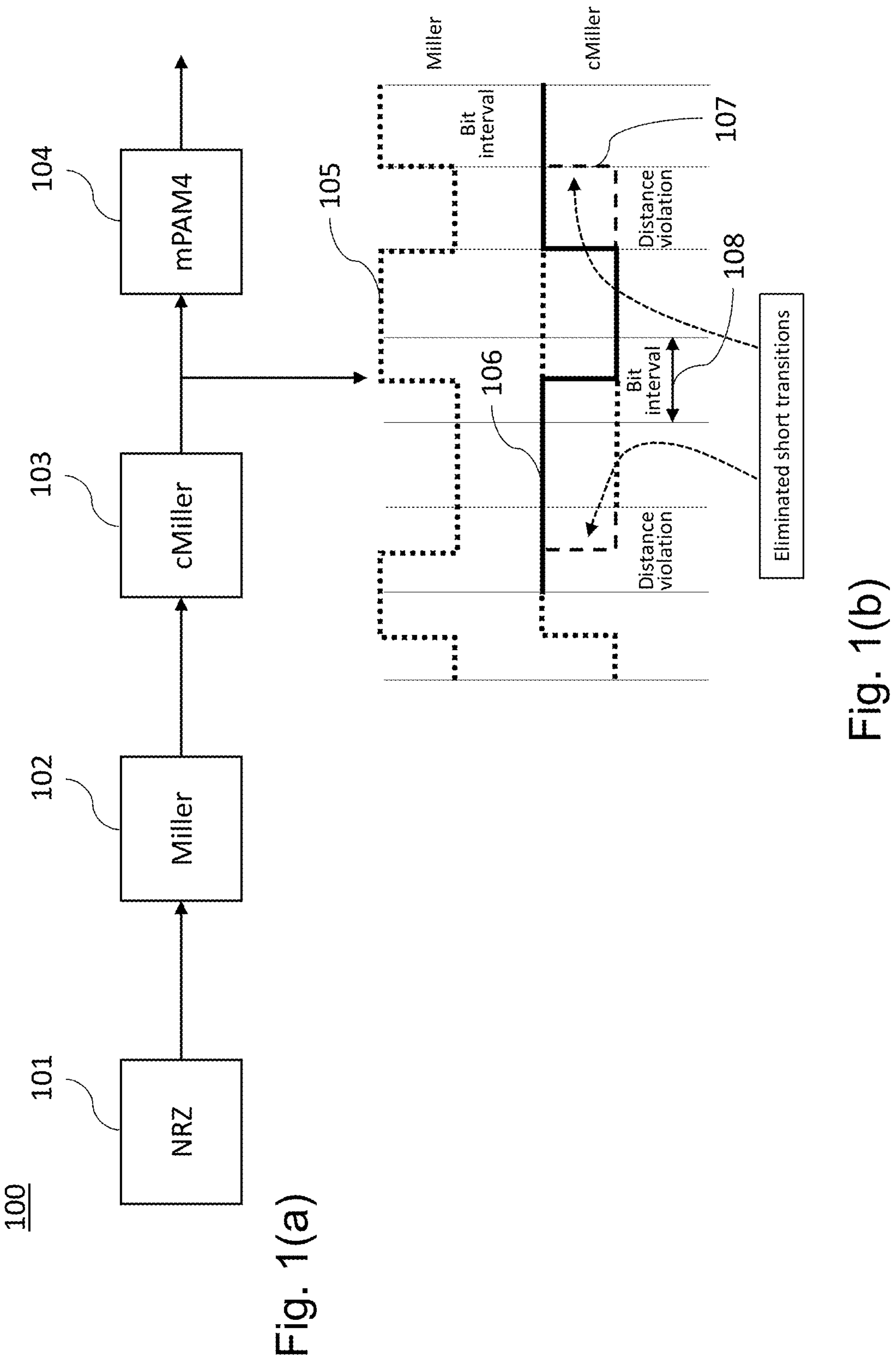
FIG. 1(*b*) schematically illustrates an example of generation of a compressed Miller sequence according to embodiments of the disclosure.

FIG. 1(*a*) schematically illustrates an exemplary block diagram for a transmitting apparatus according to embodiments of the disclosure. As mentioned above, the transmitting apparatus 100 is configured to transmit data in a communication system. For example, the transmitting apparatus 100 may be implemented within an optical communication system, e.g., a PON system. In the following examples/embodiments, the disclosure mainly aims at implementation in an optical communication system. However, it is appreciated that the proposed solution (methods and apparatuses) may also be applicable to other communication systems such as for radio communications.

The transmitting apparatus 100 is configured to code input data bits (included in an input binary data stream) and to generate an output signal for transmission. Specifically, the input data bits may be coded as data symbols and the transmitting apparatus 100 may further be configured to modulate an optical carrier signal using the data symbols. Thus, a part of the transmitting apparatus 100 may comprise one or more means/units for coding the input data bits which can be regarded as "coder" in the transmitting apparatus 100.

As illustrated in FIG. 1(*a*), the transmitting apparatus 100 (or more specifically, the coder) includes means for performing different coding stages. In the embodiment, assuming a random NRZ sequence is generated based on the input data bits at a data sequence generator 101. In order to remove the randomness in the NRZ sequence, a Miller encoding 102 may be applied to create a sequence with known symbol lengths. Accordingly, at the output of the Miller encoding 102, a bi-level sequence (i.e., a Miller sequence) with known (predetermined) symbol duration of 2, 3, or 4 half slots may be obtained with a half slot being half the duration of a basic NRZ symbol (corresponding to half the bit duration of the input binary data stream).

As indicated above, a Miller waveform of the Miller sequence at the output of the Miller encoder 102 may have three different predetermined symbol durations, namely, a duration of two half-clock intervals for [1,1] or [0,0] transitions, a duration of three half-clock intervals for [1,0,0] or [0,0,1], or a duration of four half-clock intervals [1,0,1]. Herein, a half-clock interval may correspond to the half slot being half the bit duration of the input binary data stream (i.e., a half-bit duration). The proposed approach further eliminates the transitions of symbol levels with shortest intervals (e.g., the two half-clock intervals). In this way, high frequency portion of the signal spectrum can be replaced by series of lower frequency components.

Subsequent to the Miller coding, symbols with a duration of two half slots (corresponding to a complete bit duration of the input binary data stream) in the Miller sequence may be eliminated using a compressed Miller coding 103. The compressed Miller coding 103 is configured to analyze the symbol edges in the Miller sequence and to hide/eliminate those symbol edges which have been determined to be too close in time, e.g., at an interval/distance (separation) of two half slots, and further to produce a new sequence with longer symbols.

Specifically, the compressed Miller coder 103 is configured to receive coded data symbols from the Miller encoder 102 and may include means for comparing the symbol duration of the coded data symbols and means for converting the coded data symbols into a transformed symbol sequence. More specifically, the compressed Miller coder 103 may convert the coded data symbols into the transformed symbol sequence by eliminating one or more of the coded data symbols if a corresponding symbol duration is shorter than or equal to a predefined bit duration (e.g., a duration of two half slots). If a corresponding symbol duration is longer than the predefined bit duration, the compress Miller coder 103 may maintain one or more of the coded data symbols.

FIG. 1(*b*) schematically illustrates an example of generation of a compressed Miller sequence according to embodiments of the disclosure. Herein, the coded data symbols (i.e., the Miller sequence) and the transformed symbol sequence at the output of the compressed Miller coder 103 (i.e., the c-Miller sequence) are compared, as indicated by signals 105 and 106, respectively. As illustrated, the half-clock interval corresponds to the half slot being half the bit duration of the input binary data stream as indicated by 108, and those symbols which have a duration of two half slots are eliminated by eliminating the corresponding short transitions as indicated by 107. A more detailed comparison of the Miller sequence with the proposed c-Miller sequence is shown in FIG. 2.

Figure 2:
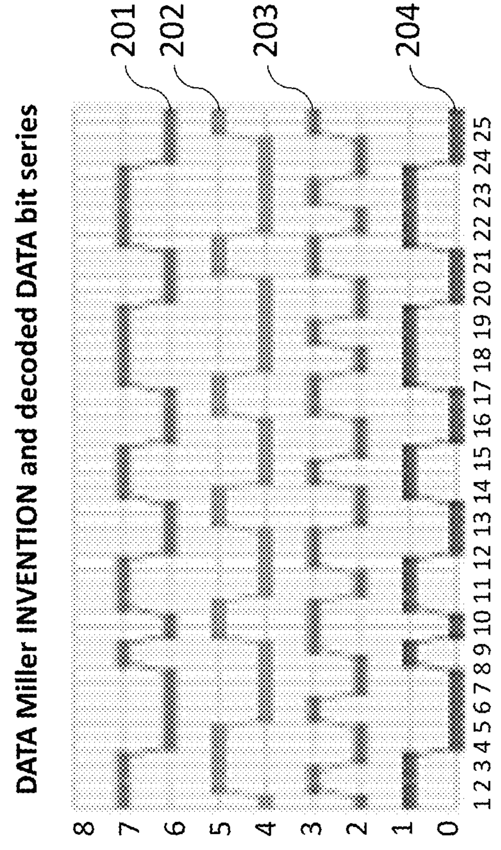
FIG. 2(*a*) illustrates an exemplary comparison of output sequences at different coding stages of FIG. 1(*a*) according to embodiments of the disclosure.
Figure 2:
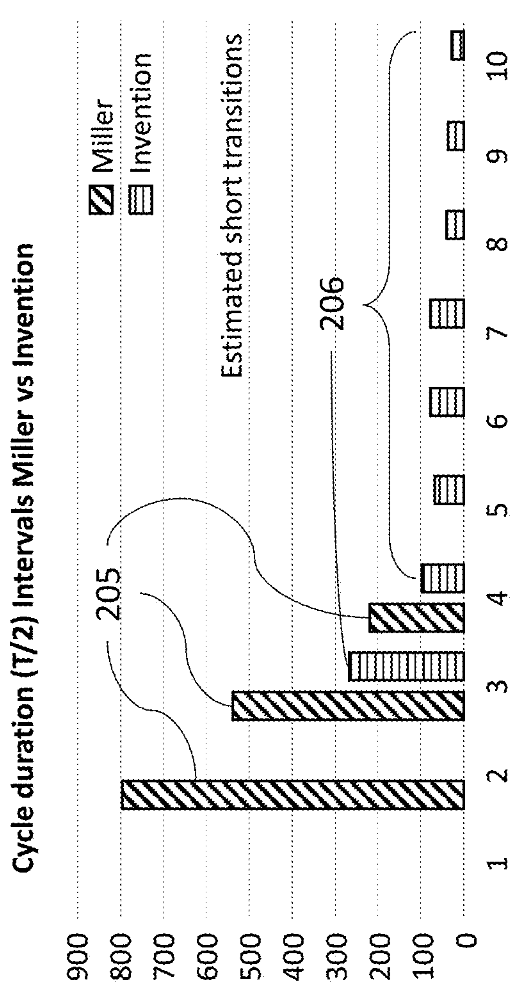

FIG. 2(*a*) illustrates an exemplary comparison of output sequences at different coding stages of FIG. 1(*a*) according to embodiments of the disclosure. Herein, details on the waveforms are provided for information data 204, Miller sequence 203, the proposed c-Miller sequence 202 and the decoded data 201. FIG. 2(*b*) illustrates a histogram chart showing the distribution of symbol durations for the Miller sequence and for the proposed c-Miller sequence according to embodiments of the disclosure. The horizontal axis of the histogram chart indicates the interval of symbol durations which has been measured in half-clock cycles (the half slot being half the bit duration of the input binary data stream as indicated by 108). It can be seen that the conventional Miller sequence only has symbol durations of two half slots, three half slots and four half slots as indicated by 205, while the proposed c-Miller sequence does not have the symbol duration of two half slots and the number of symbols having the three and four half slots is also reduced, as indicated by 206. On the other hand, a tail of longer intervals may be seen that translates the signal into a higher low frequency content. This tail can be limited in the creation of a new stream if needed. It can also be seen that there are less transitions that reduce the high frequency content as well.

Accordingly, the proposed mechanism reduces the required bandwidth by eliminating short symbols from the input data (e.g., NRZ) sequence. The mechanism combines time and amplitude dimensions to maximize the compression of the incoming signal. To eliminate short symbols, the mechanism analyzes the symbol edges and hides those that are too close in time and produce a new sequence with significantly longer symbols and multilevel values. According to some embodiments of the present disclosure, the proposed mechanism may be conducted as follows:

Step 1: Eliminating Randomness of Symbol Length in the NRZ Sequence

Since in a random NRZ sequence the symbol length is also random, the first phase of the mechanism is to create a sequence with known symbol lengths. This is achieved by applying a Miller encoding to the incoming NRZ sequence. The output of the Miller code is a bi-level sequence with symbols of duration 2, 3 or 4 half slots. A half slot is half the duration of a basic NRZ symbol (corresponding to the bit duration of the data).

Step 2: Hiding (i.e., No Drop) Unwanted Too Close Transitions

This step eliminates symbols with duration of two half slot in the Miller sequence. According to some embodiments, this step may be carried out as below:

- At a transition the distance to the previous transition (i.e., time separation/interval) is measured, and
  - if it is not two half slots, the transition is mapped into the output stream.
  - if it is two half slots then, the output sequence ignores this transition, and the current value is replicated for next symbol (e.g., 4 half symbols) and an internal length violation flag is raised.
    - the flag marks the beginning of a special cycle then ends when the following symbol has an appropriate length, then the flag is put down again.
    - during the duration of the special cycle (i.e., the elimination duration), the output sequence is maintained the same as the symbol at the beginning of the cycle.
    - when the special cycle ends, the following sequence is either the same as the input sequence, or is inverted depending on the location of the end of the cycle (e.g., at the beginning of a half slot or at the middle of a half slot).
  - if no flag is risen, then the transition is mapped into the output stream (i.e., as in the case where the difference of the transitions does not match the interval of two half slots).

Subsequently, the above mentioned Step 2 may further eliminate symbols having durations of 3 and 4 half slots from the previous sequence (i.e., the c-Miller sequence). Returning back to FIG. 1(*a*), the transmitting apparatus 100 may further comprise means for converting said transformed symbol sequence into a multilevel signal (as a multilevel symbol generator or PAM encoder 104) for an output signal for transmission. This is to eliminate the symbols having durations of 3 and 4 half slots. To eliminate these symbol lengths/durations the proposed mechanism produces a multilevel sequence, namely modified pulse amplitude modulation (mPAM) signal, that varies the levels at adequate input signal transitions. The modified PAM signal adds the amplitude dimension to the time dimension used in the previous stage.

Figure 3:
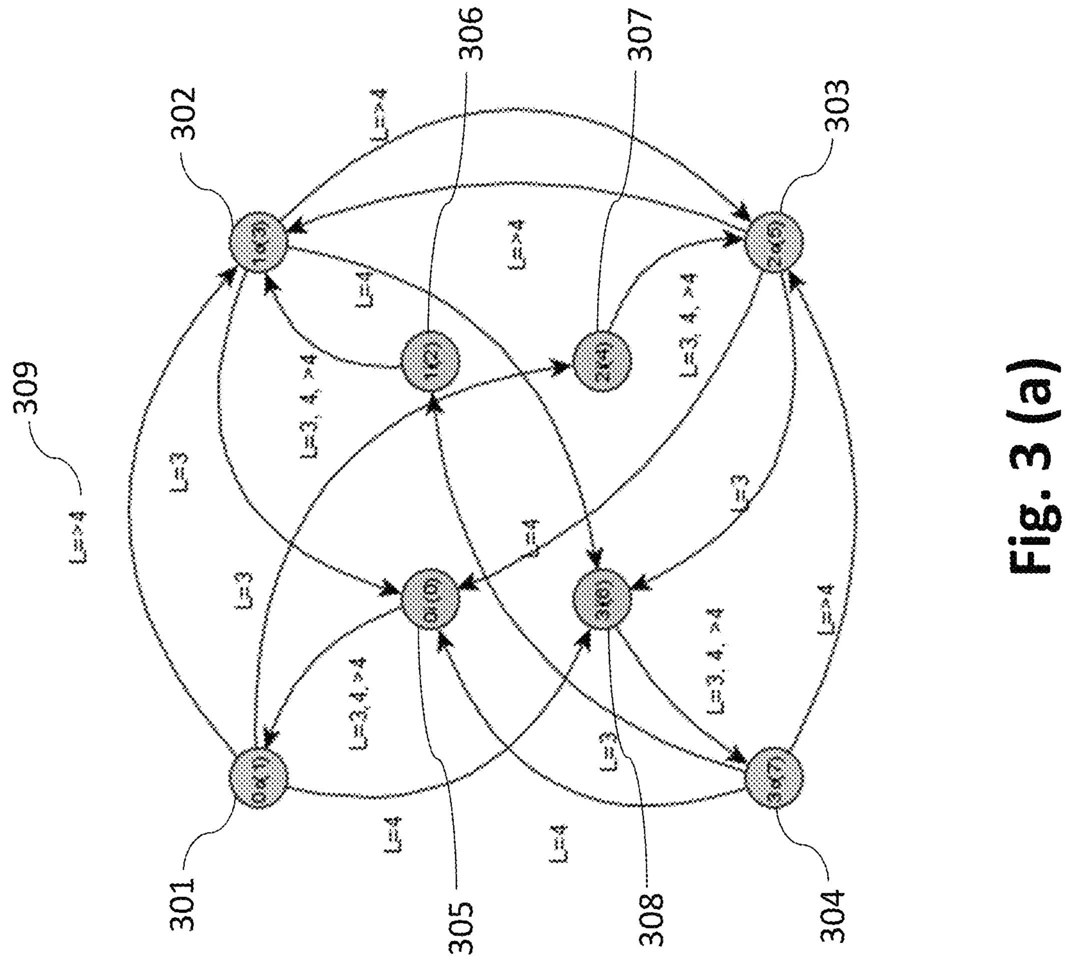
FIG. 3(*a*) schematically illustrates an exemplary state machine for symbol conversion according to embodiments of the disclosure.
Figure 3:
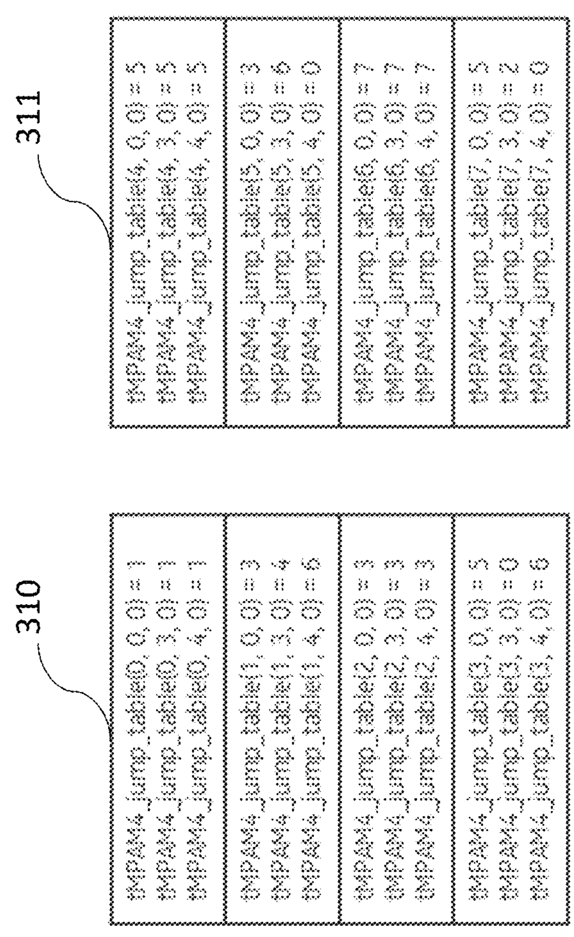

According to some embodiments, the conversion may be based on a state machine (and also a corresponding lookup table) as illustrated in FIG. 3 and may be conducted as follows:

- The output sequence is built following the rules defined in a state machine as shown in FIG. 3(*a*). Each state has a signal level associated and transitions to the other states depending on the length of the symbols (as indicated by 309).
- The state machine is composed of two set of states: inner states (305, 306, 307, 308) and outer states (301, 302, 303, 304). States are numbered from 0. Inner states act as shadow states of the outer states and are numbered sequentially (e.g. 0 and 1; 2 and 3, . . . ). L denotes the next symbol duration in half slots.
- Output sequence changes signal level only in transitions from outer states.
- The signal value is linked to the pair of states (e.g., for state 0 and 1, the output is 0, for states 2 and 3, the output signal is 1 and so on).
- At every transition in the input sequence, the distance (i.e., time separation/interval) from the previous one is computed.
- If the current state in the state machine is an inner state (305, 306, 307, 308), the next state is its shadow outer state (301, 302, 303, 304). If the current state is an outer state (301, 302, 303, 304), the next state is determined based on the definition in the state machine.
- Transitions are defined to ensure the highest degree of bandwidth compression.
- For durations of 3 or 4 the next step is an inner state (305, 306, 307, 308), for all other durations the next step is an outer state (301, 302, 303, 304). All transitions from outer states create a level transition in the output sequence.

In summary, the example state machine as shown in FIG. 3(*a*) has 4 outer states and 4 inner states. It is appreciated that these inner states enable reducing transitions, while the outer states may generate coded signals. Specifically, the signal level for the output sequence may be based on: signal level=int(state/2), where state value=0, 1, . . . , 7. Besides, the next state may be determined based on the current state and the next symbol duration, namely, next state=f(current state, next symbol duration). Also, the state transition may take place at a symbol edge. Accordingly, the state machine may also be seen as a lookup table for the mPAM coding as shown in FIG. 3(*b*), where the first index within the bracket represents the current state value and the second index within the bracket represents the next symbol duration/length L, and the output will be determined based on the definition of the state machine.

For example, in the left part 310 of the lookup table, when the current state is 1 (as indicated by state 301 as an outer state) and the next symbol duration is 3, the output state will be 4 (as indicated by state 307 as an inner state), while the output state will be 6 (308) if the next symbol duration is 4 for the same current state 1. On the other hand, when the current state is 2 (as indicated by state 306 as an inner state), the output state will be 3 (as indicated by state 302 as an outer state) irrespective of the next symbol duration. Similar analyses are applicable to the right part 311 of the lookup table.

It should be noted that the state machine and the lookup table as shown in FIG. 3 are merely one of the examples defining the rule for converting said transformed symbol sequence into a multilevel signal to eliminate symbols with short symbol durations. This illustrative example allows for eliminating symbols having durations of 3 and 4 half slots and for generating a PAM4 signal. It is appreciated that the number of the states and the definition of the state machine may deviate from this illustrative example for eliminating symbols having durations other than 3 and 4 half slots and for generating, e.g., a PAM5 signal. In the case of generating a higher-order PAM signal (such as PAM5), transmission speed of up to 200 Gbps may be achieved while using 25 Gbps conventional optical devices.

It is further appreciated that the proposed scheme provides a drastic reduction of the required bandwidth, thereby allowing for significant increase in transmission speed while keeping the use of cheaper devices of lower bandwidth. This is because no level transition takes place in case of state transitions from the inner states, which can reduce symbol transitions for the output sequence at these symbol lengths (i.e., durations of 3, 4, or 5 halt slots).

Figures 4A, 4B, 4C, 4D:
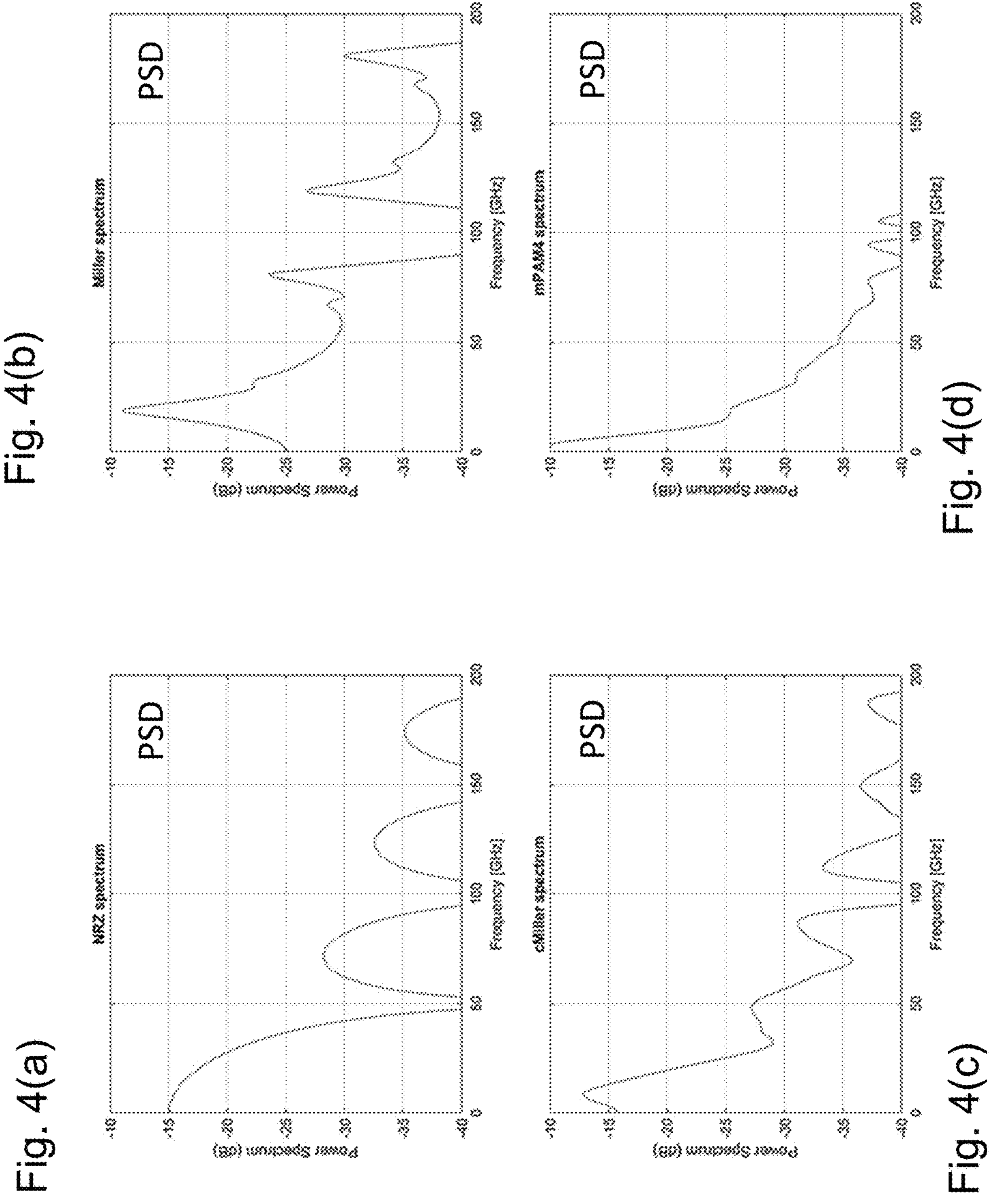
FIG. 4(*a*)-(*d*) illustrates the corresponding power spectral density at each stage of the transmitter chain as illustrated in FIG. 1(*a*) according to embodiments of the disclosure.

FIG. 4 shows the corresponding power spectral density at each stage of the transmitter chain as illustrated in FIG. 1(*a*) according to embodiments of the disclosure. Specifically, FIG. 4(*a*) shows the power spectral density for the NRZ sequence at the output of the NRZ generator 101, FIG. 4(*b*) shows the power spectral density for the Miller sequence at the output of the conventional Miller encoder 102, FIG. 4(*c*) shows the power spectral density for the compressed Miller sequence at the output of the compressed Miller encoder 103, and FIG. 4(*d*) shows the power spectral density for the mPAM4 sequence at the output of the mPAM encoder 104. It can be seen that the power spectral density becomes more and more compact as the data flows from the first block (NRZ encoding 101) to the last one (mPAM4 encoding 104) of the transmitting apparatus 100.

Figure 5:
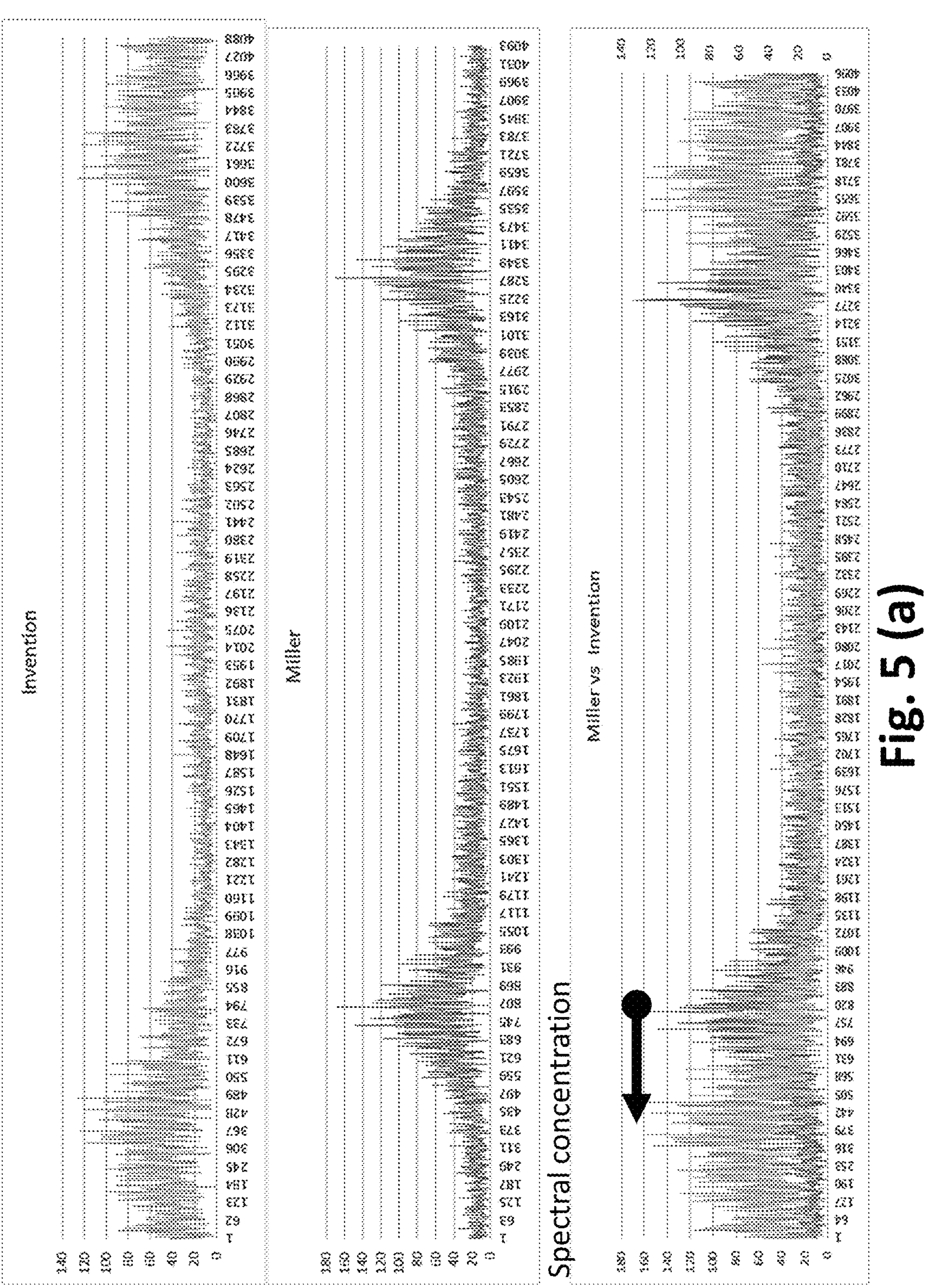
FIG. 5(*a*)-(*b*) illustrates an exemplary spectral compression performance using the proposed compressed-Miller coding and the proposed modified PAM4 coding according to embodiments of the disclosure.
Figure 5:
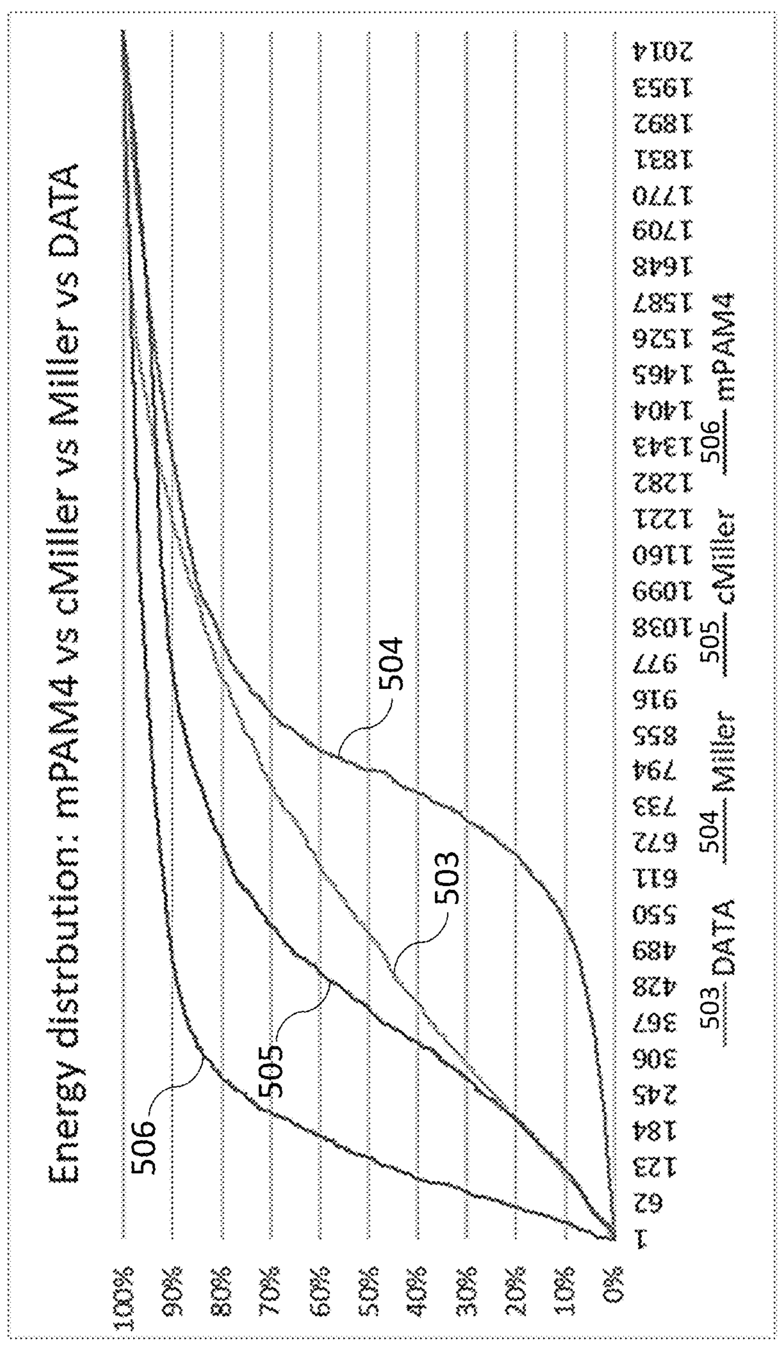

Similar results can be observed in the spectrum shown in FIG. 5(*a*) for the conventional Miller sequence 502 versus the compressed Miller sequence 501. Clearly, with the compressed Miller coding as proposed in the present disclosure, the signal spectrum can be shifted towards the lower frequency region, as indicated by 507. FIG. 5(*b*) shows a comparison of the degree of energy compactness at each stage of the transmitting apparatus 100. The corresponding energy distribution for the NRZ sequence, the conventional Miller sequence, the compressed Miller sequence and the mPAM4 sequence is respectively indicated by curve 503, 504, 505 and 506. For the compressed Miller sequence and the mPAM4 sequence, the signal energy is more concentrated at the lower frequency region compared to the signal energy for the NRZ sequence and the conventional Miller sequence. As mentioned above, such spectral concentration at the lower frequency region can lead to reduction of the required bandwidth, thereby allowing for significant increase in transmission speed while keeping the use of cheaper devices of lower bandwidth.

Figure 6:
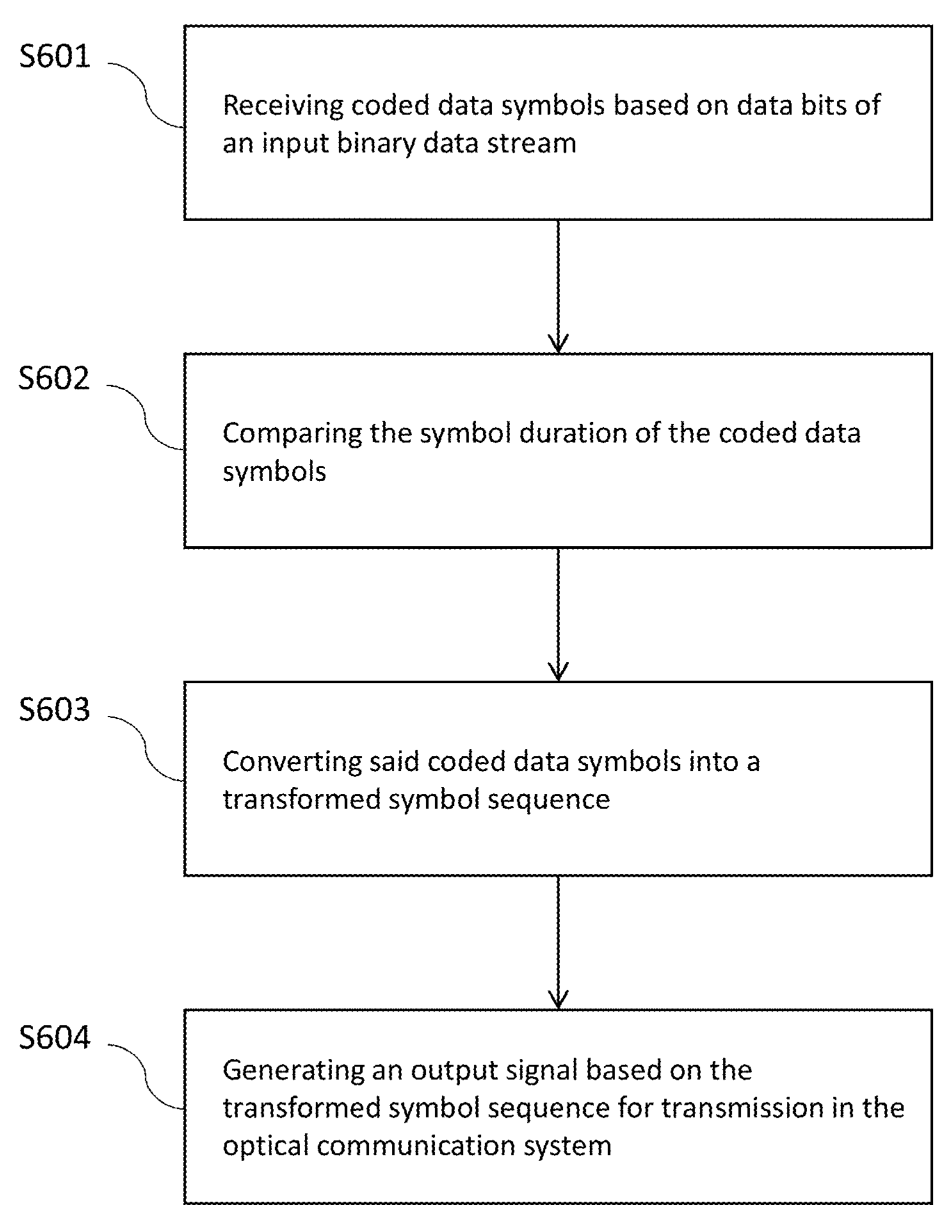
FIG. 6 illustrates an exemplary method for transmitting data in an optical communication system according to embodiments of the disclosure.

FIG. 6 illustrates a method for transmitting data in an optical communication system according to embodiments of the disclosure. The method 600 can be implemented by, for example, the transmitting apparatus 100 as illustrated in FIG. 1(*a*), and may include an encoding process applicable to information data to be transmitted. The method 600 comprises receiving (step 601) coded data symbols based on data bits of an input binary data stream. As indicated above, each of the coded data symbols may have a symbol duration of a predetermined type in relation to a bit duration of the input binary data stream. The method 600 comprises comparing (step 602) the symbol duration of the coded data symbols. The method 600 also comprises converting (step 603) the coded data symbols into a transformed symbol sequence. Besides, the method 600 further comprises generating (step 604) an output signal based on the transformed symbol sequence for transmission in the optical communication system.

As indicated above, the coded data symbols may be converted into the transformed symbol sequence (e.g., the compressed-Miller (c-Miller) sequence) by eliminating one or more of the coded data symbols if a corresponding symbol duration is shorter than or equal to a predefined bit duration, and by maintaining one or more of the coded data symbols if a corresponding symbol duration is longer than the predefined bit duration.

It is appreciated that, although the embodiment mainly aims at implementation in an optical communication system. the proposed transmitting method may also be implemented in other communication systems such as for radio communications.

Figure 7:
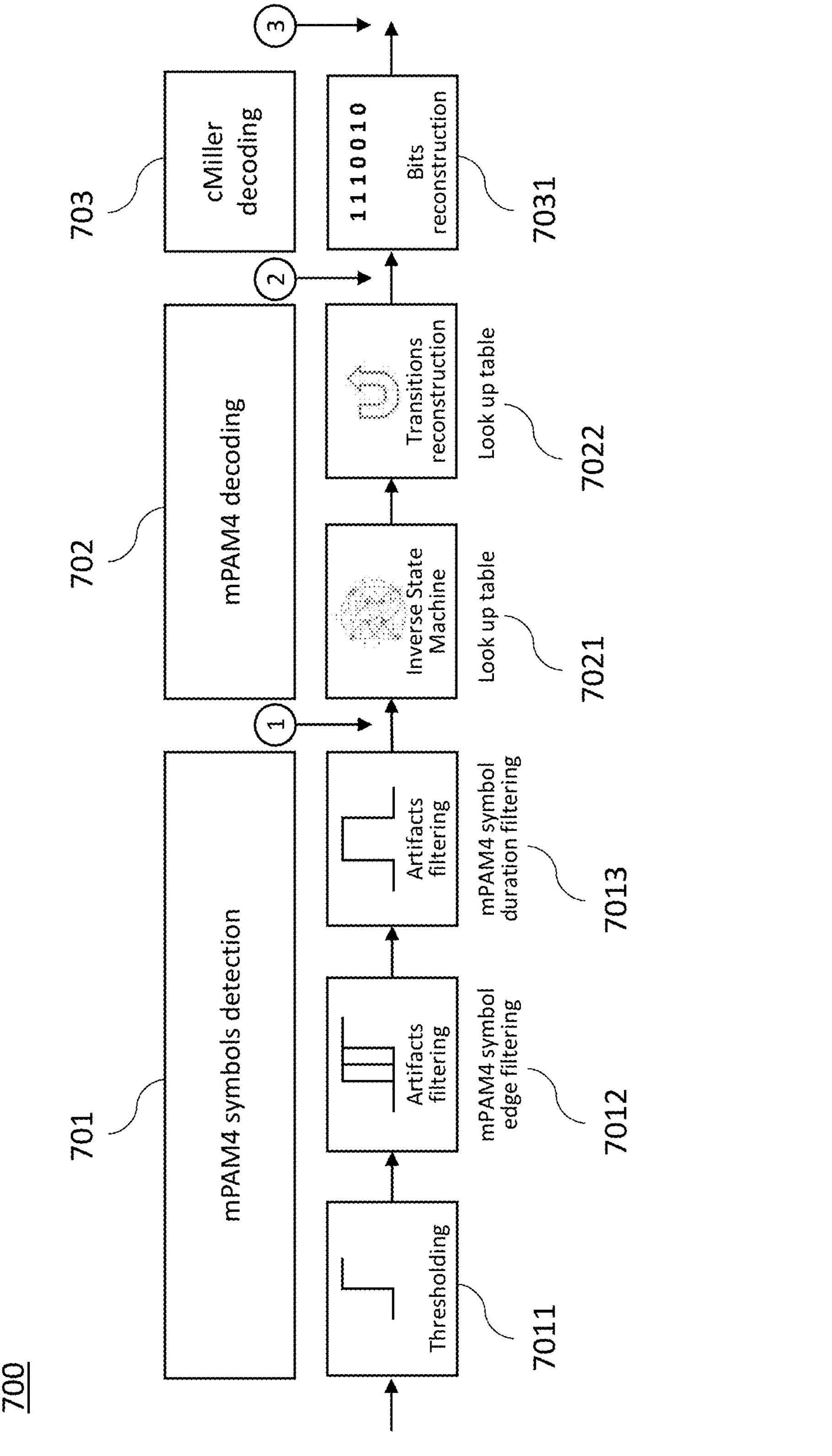
FIG. 7 schematically illustrates an exemplary block diagram for a receiving apparatus according to embodiments of the disclosure.

FIG. 7 schematically illustrates an exemplary block diagram for a receiving apparatus according to embodiments of the disclosure. As mentioned above, the receiving apparatus 700 is configured for receiving information data in an optical communication system. In particular, the receiving apparatus 700 is configured for receiving information data which has been encoded using a coder similar to the transmitting apparatus 100 or based on a method similar to the method 600. Namely, the information data may be carried by a multilevel signal generated using a coder similar to the transmitting apparatus 100 or based on a method similar to the method 600. Thus, the receiving apparatus 700 may perform a decoding process corresponding to the encoding process as conducted by the transmitting apparatus 100. Similar to the transmitting apparatus 100, the receiving apparatus 700 may also be implemented within a PON system.

The receiving apparatus 700 is configured to receive and sample the multilevel signal and to regenerate the information data from the received multilevel signal. Specifically, signal levels of the received multilevel signal may be detected and analyzed for conversion into corresponding data symbols/bits. For example, direct intensity detection (without phase tracking) may be employed at the receiving apparatus 700. Besides, similar to the transmitting apparatus 100, a part of the receiving apparatus 700 may comprise one or more means/units for converting the multilevel signal into symbols and for decoding the symbols to obtain the information data, which can be regarded as "decoder" in the receiving apparatus 700.

As illustrated in FIG. 7, the receiving apparatus 700 (or more specifically, the decoder) includes means for performing different decoding stages. In the embodiment, assuming the multilevel signal is a modified PAM4 (mPAM4) signal which has been generated using the state machine as illustrated in FIG. 3. The mPAM4 signal may be detected by the means for mPAM4 symbol detection 701 which may include three detection steps (i.e., detection levels) for extract the mPAM4 symbols.

The first step is the thresholding detection (first level detection) of the mPAM4 signal as indicated by 7011. The mPAM4 signal may be sampled at a rate twice a bit rate of the information data corresponding to the half-bit durations (e.g., at a half a cycle timing based on 2× original signal clocking, or at one original signal clocking with rising and falling edges used for triggering operations). At the same step performed by the means 7011, an amplitude of the sampled mPAM4 signal may be further translated into a level index based on level threshold crossing detection. This may be carried out by a level crossing detector. In an embodiment where four signal levels (0, 1, 2, and 3) can be identified (i.e., mPAM4), there may be three levels located at the midpoint of the signal voltages associated with (voltage) distances between 0 and 1, 1 and 2 and 2 and 3 signal levels. Similarly, in the case of mPAM5 signal, there may be four levels located at the midpoint of the signal voltages associated with the distances between 0 and 1, 1 and 2, 2 and 3 and 3 and 4 signal levels. However, it should be noted that the output of this first level detection may still contain edge transition artifacts due to noise and filtering effect of the transmission channel.

Subsequent to the first level thresholding detection, the signal is further processed by an edge artifact filter 7012 which eliminates the edge detection artifacts (i.e., the second level detection). At this step, artifacts incompatible with the code structure may be eliminated, i.e., to eliminate a signal level transition within a predetermined duration. For example, more than two or three transitions within one half-slot duration may be considered as undesired artifacts and shall be removed. This may be done by tracking transitions at the output of the first level detection and filtering out those transitions which are too close to each other. However, it should be further noted that the output of the second level detection (i.e., a first multilevel symbol sequence) may still contain symbols with too short durations (i.e., not being qualified as e.g., the mPAM4 symbols).

In order to obtain better mPAM4 symbols for further decoding, a third level detection may be applied to eliminate the duration artifacts of the mPAM4 symbols, as indicated by the duration artifact filter 7013. Similar to the edge artifact filter 7012, the duration artifact filter 7013 also tracks the transitions and filters out those transitions that would create mPAM symbols having too short durations (e.g., two or three half slots). That is, the duration artifact filter 7013 is applied to eliminate one or more symbols from the first multilevel symbol sequence if a corresponding symbol duration of the one or more symbols is shorter than a predefined threshold duration.

After the completion of the mPAM4 symbol detection, the output of the duration artifact filter 7013 (i.e., a second multilevel symbol sequence) may be further processed by the means for multilevel decoding (e.g., mPAM4 symbol decoding) as indicated by 702 for obtaining a bi-level symbol sequence. Specifically, the mPAM4 symbol decoding may be based on an inverse state machine and/or lookup table 7021 to reconstruct the original symbol transitions 7022. Herein, a translation from the variation of signal levels into the associated symbol duration/length may be performed. This translation may follow the definition of state transitions in the state machine used for creating the mPAM signal at the transmitting side (e.g., the coder 100). For example, the translation may be based on the state machine and/or lookup table as illustrated in FIG. 3.

As indicated above, some transitions may be hidden/eliminated when generating the multilevel signal (mPAM symbols). Thus, at the decoding side, a new transition may be regenerated for the state/level variations which are associated with hidden transitions at the encoder, for example, after an adequate number of half cycles (slots). After the regeneration of a transition, the remaining half slots may be filled with the complementary value until the next transition in the mPAM sequence to be decoded appears.

After the completion of the mPAM4 decoding 702, the output of the multilevel decoding means 702 (the bi-level symbol sequence) may be further processed by the means for data decoding 703 (e.g., compressed-Miller decoding based on a similar rule for the above mentioned c-Miller encoding performed by 103) for obtaining the information data.

It is appreciated that, although the embodiments provided above mainly aim at generating/detecting mPAM4 signals, the proposed scheme/mechanism in the present disclosure may also be applied to other possible multilevel signals, e.g., mPAM5 signals, with modifying definitions for state transitions similar to the state machine/lookup table shown in FIG. 3.

According to some embodiments of the present disclosure, the proposed mechanism for the decoder 700 may be conducted as follows:

Step 1: First Level Detection—Thresholding

All steps at the receiver are done at a half a cycle timing (e.g., 2× original signal clocking, 300 Gbs for 150 Gbps NRZ sequence, or one clock at 150 Gbps with rising and falling edges used for triggering operations). At the receiver, the signal is passed through a level crossing detector. In the case of 4 levels (i.e., mPAM4), there will be four levels located at the midpoint of the signal voltages associated with (voltage) distances between 0 and 1, 1 and 2, 2 and 3 and 3 and 4 signal levels. At the output of this first step, a multilevel signal is created but, due to noise and filtering effect of the transmission channel, the detection may not be perfect, which may not provide a good basis for mPAM decoding.

Step 2: Second Level Detection—Edge Detection Artifacts Elimination

The second step of the detection eliminates artifacts incompatible with the code structure (e.g., two or three transitions with one half slot distance/interval each). To achieve this result, transitions at the output of the first detection are tracked and those too close are filtered out.

Step 3: Third Level of Detection—mPAM4 Symbols Duration Artifacts Elimination

After the second detection stage, the detected multilevel signal may still not be ready for decoding as some symbols might not qualify as mPAM4 symbols, because they are too short. As in step 2, the transitions are tracked and for those that would create mPAM symbols shorter than 4 half slots are filtered out.

Step 4: Second Level mPAM Decoding

The decoding stage is now ready to start. At each transition, a translation from the variation of signal levels into the symbol length associated is done. This translation follows the definition of state transitions in the state machine used for creating the mPAM signal at the coder side. For the state/level variations that are associated with hidden transitions at the encoder, a new transition is regenerated after the adequate number of half cycles. After this regenerated transition, the remaining half slots are filled with the complementary value until the next transition in the mPAM4 sequence to be decoded appears.

It is appreciated that, although the embodiment mainly aims at implementation in an optical communication system. the proposed receiving apparatus may also be implemented in other communication systems such as for radio communications.

Figure 8:
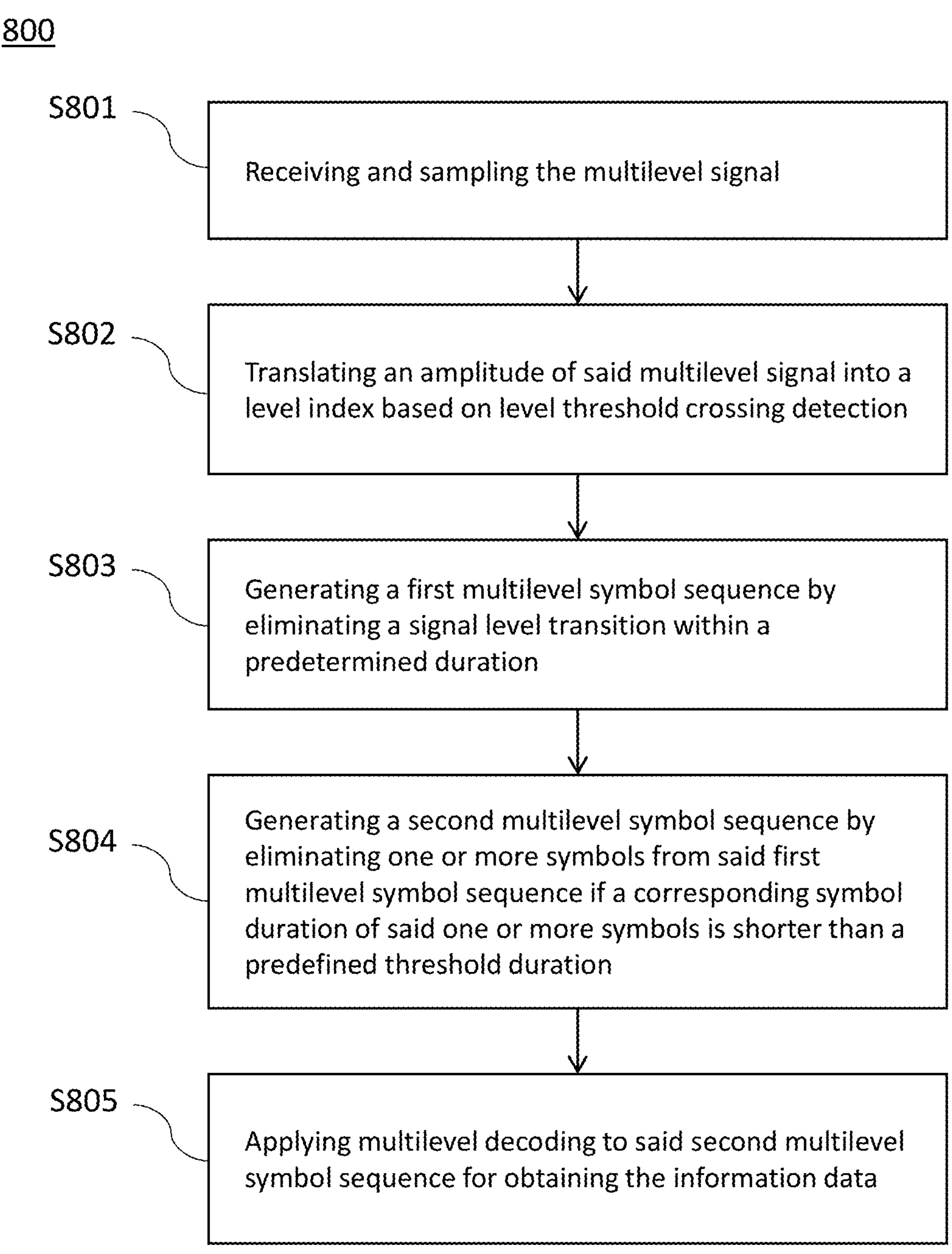
FIG. 8 illustrates an exemplary method for receiving information data in an optical communication system according to embodiments of the disclosure.

FIG. 8 illustrates a method for receiving information data in an optical communication system according to embodiments of the disclosure. The method 800 can be implemented by, for example, the receiving apparatus 700 as illustrated in FIG. 7, and may include a decoding process applicable to a multilevel signal carrying the information data. The method 800 comprises receiving and sampling (801) the multilevel signal. The method 800 comprises translating (802) an amplitude of said multilevel signal into a level index based on level threshold crossing detection. The method 800 also comprises generating (803) a first multilevel symbol sequence by eliminating a signal level transition within a predetermined duration. Besides, the method 800 further comprises generating (804) a second multilevel symbol sequence and applying (805) multilevel decoding to said second multilevel symbol sequence for obtaining the information data.

More specifically, the second multilevel symbol sequence may be generated by eliminating one or more symbols from said first multilevel symbol sequence if a corresponding symbol duration of said one or more symbols is shorter than a predefined threshold duration.

It is appreciated that, although the embodiment mainly aims at implementation in an optical communication system. the proposed receiving method may also be implemented in other communication systems such as for radio communications.

Figure 9A:
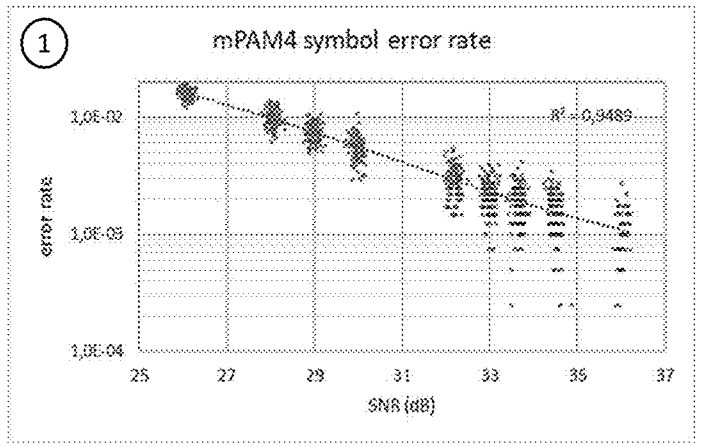
FIGS. 9(*a*)-9(*d*) show the corresponding receiver performance at each stage of the receiving apparatus 700 (i.e., the receiver chain) as illustrated in FIG. 7 according to embodiments of the disclosure.
Figure 9B:
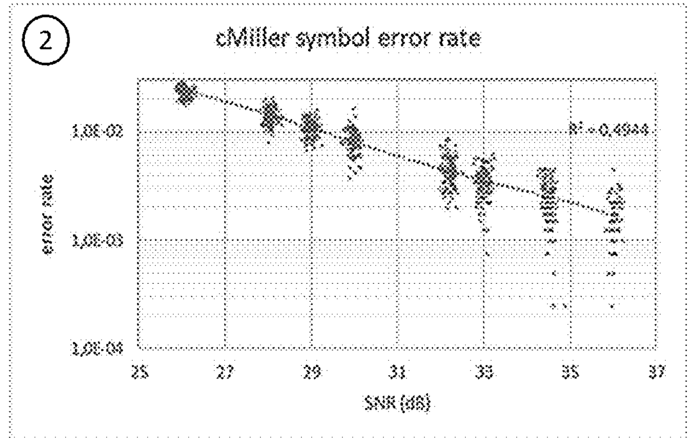
Figure 9C:
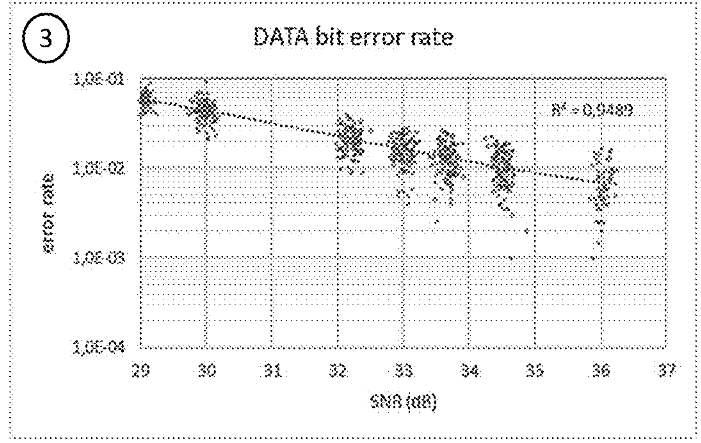
Figure 9:
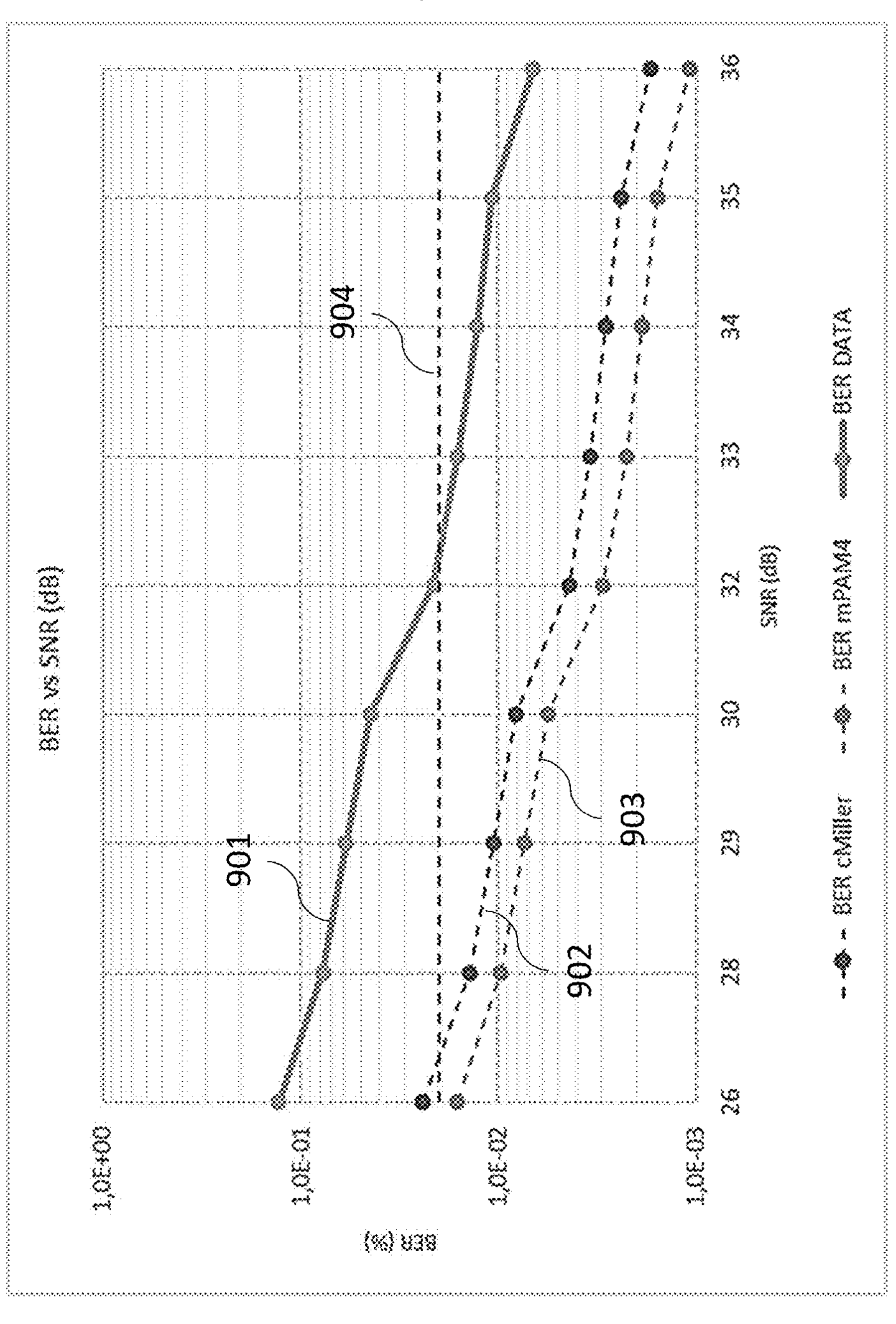

FIG. 9 shows the corresponding receiver performance at each stage of the receiving apparatus 700 (i.e., the receiver chain) as illustrated in FIG. 7 according to embodiments of the disclosure. Specifically, FIG. 9(*a*) shows the error levels (with respect to the bit error rate, BER) versus signal-tonoise ratio (SNR) at the output of the mPAM4 symbol detection 701 (i.e., the first multilevel symbol sequence), FIG. 9(*b*) shows the error levels versus signal-to-noise ratio (SNR) at the output of the mPAM4 decoder 702 (i.e., the second multilevel symbol sequence), and FIG. 9(*c*) shows the error levels versus signal-to-noise ratio (SNR) at the output of the c-Miller decoder 703. These BER charts are represented as clusters of dots, and each dot is the result of a simulation for a different SNR. It should be noted that FIG. 9(*c*) associated with the output of the c-Miller decoder is the one that delivers the decoded data.

FIG. 9(*d*) shows a comparison of the results from FIG. 9(*a*)-(*c*) at the respective outputs (mPAM4 symbol detection 701, mPAM4 decoder 702 and c-Miller decoder 703), with a BER-SNR curve for the data corresponding to FIG. 9(*c*) indicated by 901, with a BER-SNR curve for the second multilevel symbol sequence corresponding to FIG. 9(*b*) indicated by 902, and with a BER-SNR curve for the first multilevel symbol sequence corresponding to FIG. 9(*a*) indicated by 903. In FIG. 9(*d*), the dots are the average of the results of all simulations for the specific SNR. It can be seen that the required SNR to reach the $2\times10^{-2}$ BER threshold (as indicated by 904) may vary between those different output sequences. Besides, FIG. 9(*d*) shows a clear correlation between the three error rates lines (901, 902 and 903). It is to be appreciated that some errors occurring during the mPAM4 decoding/c-Miller decoding will not propagate into the decoded data, since the decoding is mainly based on symbol transition which seems to be robust to error propagation.

As indicated above, the proposed methods and apparatuses may be implemented in a PON system. For example, the method 600 and the method 800 may be respectively executed by an optical transmitter and an optical receiver of a PON system. For example, the transmitting apparatus 100 and the receiving apparatus 700 may be comprised in anyone of an optical line terminal (OLT) and an optical network terminal (ONT).

Figure 10:
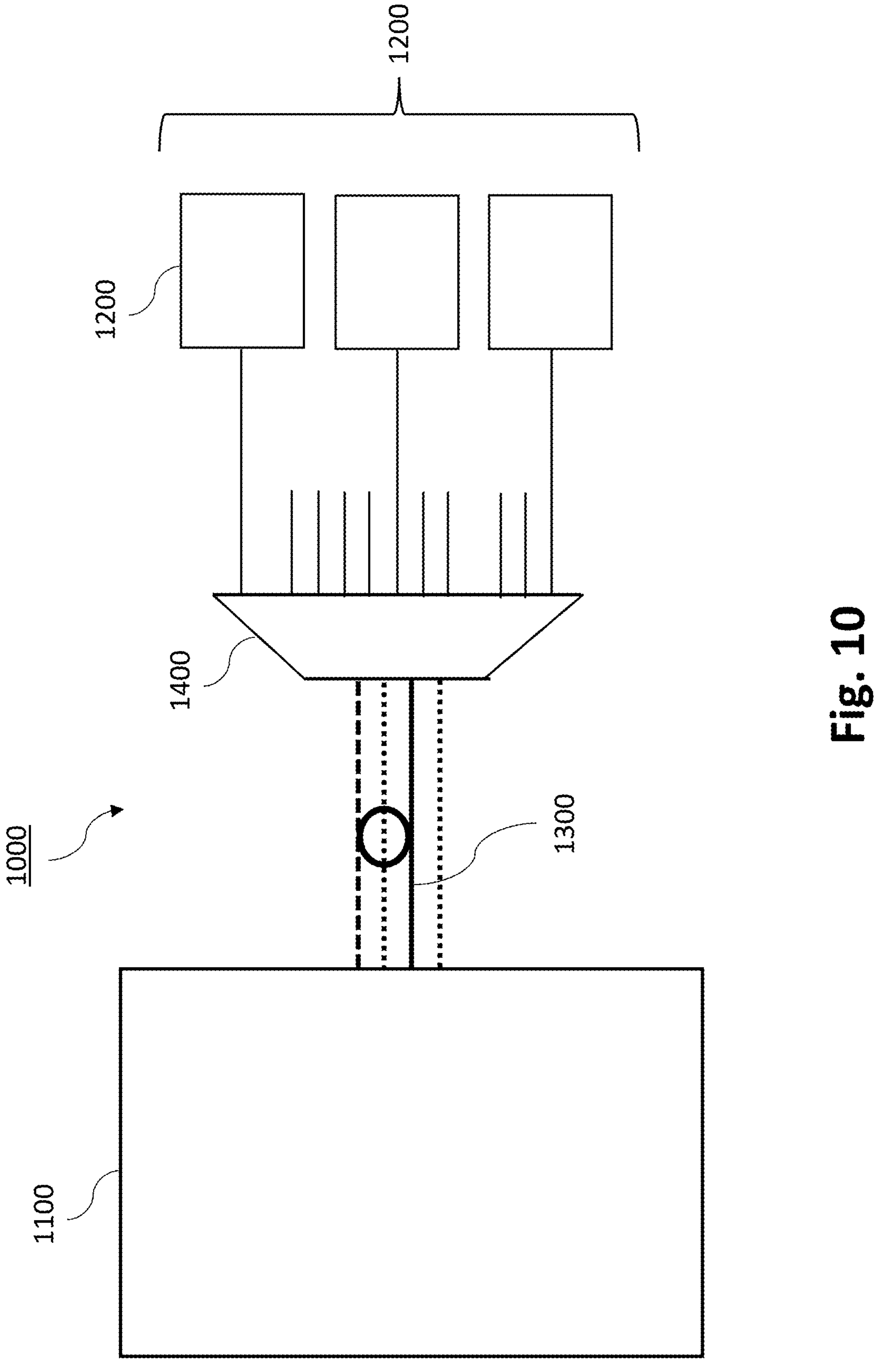
FIG. 10 schematically illustrates an exemplary embodiment of a passive optical network (PON) according to embodiments of the disclosure.

FIG. 10 schematically illustrates an exemplary embodiment of a passive optical network (PON) according to embodiments of the disclosure. The PON 1000 comprises an optical line terminal (OLT) 1100 and one or more optical network terminals (ONTs) 1200 by passively splitting the optical signal (e.g., with an optical splitter 1400). The OLT 1100 and the one or more ONTs 1200 are configured such that they can mutually exchange data over a fiber 1300. The optical fiber 1300 may comprise several kilometers (e.g., by loop). The ONT(s) 1200 may be further configured to serve one or more end-users, and whereby the OLT 1100 may be considered as the infrastructure side of the PON 1000.

Between the OLT 1100 and the one or more ONTs 1200 data may be exchanged using optical signals. To this end, both the OLT 1100 and the ONT(s) 1200 may comprise each an optical transceiver. An optical transceiver comprises an optical transmitter further including transmitting laser and a coder similar to the transmitting apparatus 100 and an optical receiver further including a receiving photodiode and a decoder similar to the receiving apparatus 700.

As used in this application, the term "means" may refer to one or more or all of the following: (a) hardware-only circuit implementations such as implementations in only analog and/or digital circuitry and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of means applies to all uses of this term in this application, including in any claims. As a further example, as used in this application, the term means also covers an implementation of merely a hardware circuit or processor (or multiple processors) or portion of a hardware circuit or processor and its (or their) accompanying software and/or firmware. The term means also covers, for example and if applicable to the particular claim element, a baseband integrated circuit or processor integrated circuit for a mobile device or a similar integrated circuit in a server, a cellular network device, or other computing or network device.

It should be noted that the device features described above correspond to respective method features that may be however not explicitly described, for reasons of conciseness. The disclosure of the present document is considered to extend also to such method features.

It should be further noted that the description and drawings merely illustrate the principles of the proposed device. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed device. Furthermore, all statements herein providing principles, aspects, and embodiments of the invention, as well as specific examples thereof, are intended to encompass equivalents thereof.

The invention claimed is:

1. A method for transmitting data in a communication system, comprising:

- receiving coded data symbols based on data bits of an input binary data stream, each of the coded data symbols having a symbol duration of a type in relation to a bit duration of the input binary data stream;
- comparing the symbol duration of the coded data symbols;
- converting said coded data symbols into a transformed symbol sequence by,
  - eliminating one or more of the coded data symbols if a corresponding symbol duration is shorter than or equal to a predefined bit duration, and
  - maintaining one or more of the coded data symbols if a corresponding symbol duration is longer than the predefined bit duration; and
- generating an output signal based on the transformed symbol sequence for transmission in the communication system.

2. The method of claim 1, wherein each coded data symbol is associated with one of a first signal level and a second signal level, the method further comprising:

- determining the symbol duration of the coded data symbols based on a time separation between transitions from the first signal level to the second signal level, or vice versa, and/or
- wherein each data bit occupies one bit duration corresponding to two half-bit durations, the method further comprising:

converting said data bits into the coded data symbols, the symbol duration for each coded data symbol corresponding to one of two half-bit durations, three half-bit durations, and four half-bit durations; and/or wherein the predefined bit duration comprises the two half-bit durations.

3. The method of claim 1, further comprising:

identifying a beginning of an elimination duration if a corresponding symbol duration of an associated coded data symbol is shorter than or equal to the predefined bit duration;

identifying an ending of the elimination duration if a following symbol duration corresponding to a subsequent coded data symbol is longer than the predefined bit duration; and maintaining a current signal level of the associated coded data symbol during said elimination duration.

4. The method of claim 3, further comprising:

determining whether the ending of the elimination duration is located at a beginning of a half-bit duration or at a middle of a half-bit duration; and based on the determination, maintaining or inverting a current signal level of the associated coded data symbol for a further subsequent coded data symbol.

5. The method of claim 3, wherein identifying the beginning of the elimination duration comprises setting a flag indicator if a corresponding symbol duration of an associated coded data symbol is shorter than or equal to the predefined bit duration, and identifying the ending of the elimination duration comprises removing said flag indicator if a following symbol duration corresponding to a subsequent coded data symbol is longer than the predefined bit duration.

6. The method of claim 1, further comprising converting said transformed symbol sequence into a multilevel signal for the output signal according to a state machine, the state machine comprising a plurality of symbol states of a first type and a second type distinct from the first type, wherein each symbol state has an associated signal level and one or more transitions to other symbol states of the state machine, the one or more transitions being defined based on a symbol duration of an input symbol of said transformed symbol sequence, wherein transitions from the symbol states of the first type do not lead to a signal level transition for the output signal, while transitions from the symbol states of the second type leads to a signal level transition for the output signal and wherein a next state of a symbol state of the first type comprises a symbol state of the second type.

7. The method of claim 6, wherein each symbol of said transformed symbol sequence is associated with one of a first signal level and a second signal level, the method further comprising:

determining symbol durations of said transformed symbol sequence based on a time separation to a previous transition from the first signal level to the second signal level, or vice versa, said symbol durations of said transformed symbol sequence being longer than the predefined bit duration, wherein said symbol durations of said transformed symbol sequence comprise at least one of the following: the three half-bit durations or the four half-bit durations.

8. A method for receiving information data in a communication system, the data being carried by a multilevel signal, the method comprising:

receiving and sampling the multilevel signal;

translating an amplitude of said multilevel signal into a level index based on level threshold crossing detection;

generating a first multilevel symbol sequence by eliminating a signal level transition within a duration;

generating a second multilevel symbol sequence by eliminating one or more symbols from said first multilevel symbol sequence if a corresponding symbol duration of said one or more symbols is shorter than a threshold duration; and applying multilevel decoding to said second multilevel symbol sequence for obtaining the information data.

9. The method of claim 8, wherein each bit of the data occupies one bit duration corresponding to two half-bit durations, and wherein the multilevel signal is sampled at a rate twice a bit rate of the data corresponding to the half-bit durations, and wherein the duration comprises the half-bit durations, and wherein if a group of an even number of consecutive level transitions take place at time intervals corresponding to the half-bit durations, the method further comprising, for elimination of a signal level transition within said duration, setting a symbol level index for outputting to the first multilevel symbol sequence based on one or more of preceding and following level indexes of said group; or the half-bit durations, and wherein if a group of an odd number of three or more consecutive level transitions take place at time intervals corresponding to the half-bit durations, further comprising, for elimination of a signal level transition within said duration, setting a symbol level index for transition in a middle of said group to the nearest level index from one or more of preceding and following level indexes of said group and setting remaining symbol level indexes for outputting to the first multilevel symbol sequence based on the one or more of preceding and following level indexes of said group.

10. The method of claim 9, wherein the threshold duration comprises four or five half-bit durations, and wherein if a group of consecutive amplitude indexes in the generated first multilevel symbol sequence forms the one or more symbols corresponding to a symbol duration shorter than the threshold duration, the method further comprising:

for elimination of the one or more symbols from said first multilevel symbol sequence, setting one or more symbol level indexes for outputting to the second multilevel symbol sequence based on at least one a nearest time or level index from one or more of preceding and following level indexes of said group.

11. The method of claim 8, for the multilevel decoding, further comprising:

translating the generated second multilevel symbol sequence into an output data symbol sequence having two signal levels according to a state machine, the state machine comprising a plurality of symbol states of a first type and a second type distinct from the first type, wherein each symbol state has an associated signal level and one or more transitions to other symbol states of the state machine, the one or more transitions being defined based on a symbol duration of an input symbol, and wherein transitions from the symbol states of the first type do not lead to a signal level transition, while transitions from the symbol states of the second type leads to a signal level transition, wherein a next state of a symbol state of the first type comprises a symbol state of the second type, the method further comprising regenerating a new symbol level transition for a state transition of the state machine associated with a symbol duration corresponding to three or four consecutive half-bit durations.

12. The method of claim 8, wherein the multilevel signal includes combinations of amplitudes and delays in amplitude transitions, and wherein the multilevel decoding generates an output bi-level symbol sequence, the method further comprising identifying one or more missing transitions in the output bi-level symbol sequence to reconstruct bits of the information data, wherein the one or more missing transitions in the output bi-level symbol sequence is identified based on a flag indicator indicative of a beginning of an elimination duration where a data symbol associated with the one or more missing transitions and having a symbol duration shorter than or equal to a predefined bit duration is eliminated.

13. The method of claim 1, wherein the communication system comprises a passive optical network, PON, system, the being executed by an optical transmitter or an optical receiver of the PON.

14. An apparatus for transmitting data in a communication system, comprising:

at least one memory configured to store instructions; and at least one processor configured to execute the instructions and cause the apparatus to perform, receiving coded data symbols based on data bits of an input binary data stream, each of the coded data symbols having a symbol duration in relation to a bit duration of the input binary data stream;

comparing the symbol duration of the coded data symbols;

converting said coded data symbols into a transformed symbol sequence, said coded data symbols being converted into the transformed symbol sequence by, eliminating one or more of the coded data symbols if a corresponding symbol duration is shorter than or equal to a predefined bit duration, and maintaining one or more of the coded data symbols if a corresponding symbol duration is longer than the predefined bit duration; and generating an output signal based on the transformed symbol sequence for transmission in the communication system.

15. An apparatus for receiving information data in a communication system, the data being carried by a multilevel signal, comprising:

at least one memory configured to store instructions; and at least one (processor configured to execute the instructions and cause the apparatus to perform, receiving and sampling the multilevel signal;

translating an amplitude of said multilevel signal into a level index based on level threshold crossing detection;

generating a first multilevel symbol sequence by eliminating a signal level transition within a duration;

generating a second multilevel symbol sequence by eliminating one or more symbols from said first multilevel symbol sequence if a corresponding symbol duration of said one or more symbols is shorter than a threshold duration; and applying multilevel decoding to said second multilevel symbol sequence for obtaining the information data.

* * * * *